United States Patent [19]

Avakian

[11] Patent Number: 4,555,540
[45] Date of Patent: Nov. 26, 1985

[54] STABILIZATION OF FLAME RETARDANT POLYCARBONATE-POLYESTER COMPOSITIONS

[75] Inventor: Roger W. Avakian, Brasschaat, Belgium

[73] Assignee: General Electric Company, Pittsfield, Mass.

[21] Appl. No.: 687,576

[22] Filed: Dec. 28, 1984

[51] Int. Cl.[4] ............................. C08K 5/52; C08K 5/53
[52] U.S. Cl. ..................................... 524/130; 524/132; 524/133; 524/412; 524/414
[58] Field of Search ............... 524/130, 132, 133, 414, 524/412; 525/439; 528/169, 287; 260/955

[56] References Cited

U.S. PATENT DOCUMENTS

| | | | |
|---|---|---|---|
| 2,899,454 | 8/1959 | McBee et al. | 260/955 |
| 3,305,520 | 2/1967 | Fritz et al. | 528/151 |
| 3,345,432 | 10/1967 | Gillham et al. | 524/130 |
| 3,370,029 | 2/1968 | Cannelongo | 524/130 |
| 3,401,121 | 10/1968 | Barkey | 528/287 |
| 3,637,898 | 1/1972 | Herwig et al. | 524/133 |
| 3,953,539 | 4/1976 | Kawase et al. | 524/414 |
| 4,273,899 | 6/1981 | Saiki et al. | 525/439 |
| 4,366,276 | 12/1982 | Freitag et al. | 524/414 |
| 4,373,044 | 2/1983 | Buxbaum et al. | 524/133 |

FOREIGN PATENT DOCUMENTS 1569296  6/1980  United Kingdom .

Primary Examiner—Veronica P. Hoke
Attorney, Agent, or Firm—Hedman, Gibson, Costigan & Hoare

[57] ABSTRACT

Blends of an aromatic polycarbonate a polyester, a halogenated flame retardant agent and a metal oxide synergist for the flame retardant are made more stable against transesterification reactions during high temperature processing by the inclusion of minor amounts of selected phosphorus-containing compounds, such as phosphorous acid or acid salt.

34 Claims, No Drawings

STABILIZATION OF FLAME RETARDANT POLYCARBONATE-POLYESTER COMPOSITIONS

BACKGROUND OF THE INVENTION

Aromatic polycarbonate resins and polyester resins based the reaction of diols with diacids constitute two classes of engineering thermoplastics useful separately to prepare shaped articles by molding, extrusion, and so forth. In recent years, interest has grown in combining these polymers into blends to provide certain property profiles not usually found with use of either polymer alone.

A shortcoming associated with such polymer blends is the tendency to form a yellow or yellowish color. This may be attributable to several causes, including the thermal degradation of the polymers upon processing at elevated temperatures. To prevent or minimize this effect, various additives have been proposed, including those based on phosphorus as described in U.S. Pat. No. 3,953,539(Kawase, et al.) and British Pat. No. 1,569,296. Freitag, et al. in U.S. Pat. No. 4,366,276 disclose flame resistant compositions of aromatic polyesters, poly(estercarbonates) and small amounts of ammonium or alkali metal salts of inorganic or organic acids, e.g., phosphoric acid salts, which are said to be more color stable.

SUMMARY OF THE INVENTION

The discovery has now been made that certain phosphorus-containing materials, such as phosphorous acid, aryl phosphonic acid and fluorocarbon-substituted derivatives of phosphonic acid, can be added in very small amounts to flame retardant blends of aromatic polycarbonates and polyesters to achieve better stability against losses in the physical properties. More specifically, blends of such polymers made flame resistant by the inclusion of the halogen-containing flame retardant agent supplemented with a metal oxide, e.g., antimony oxide, are modified to resist metal oxide-induced transesterification reactions at high temperatures by the addition of the aforementioned phosphorus-containing materials.

The presence of the metal oxide is important to enhance the flame retardant properties of the halogen-containing flame retardant agent, less of the latter being thereby required. A drawback associated with its use in this manner, however, is that the metal oxide, even in very small amounts, acts as a catalyst that induces or facilitates transesterification reactions in the blend when processed subsequently at elevated temperatures, for example, by extrusion or molding. These reactions can adversely affect the physical properties of the composition and are undesirable. The inclusion of the described phosphorus-containing compounds serves to block the catalyzing effect of the metal oxide, thus preventing such transesterification reactions from occurring, or at least minimizing them and maintaining the physical properties at or about the original levels.

DETAILED DESCRIPTION OF THE INVENTION

The compositions of the invention, in their broadest aspects, comprise thermoplastic admixtures of (a) an aromatic polycarbonate, an aromatic poly(ester-carbonate), an aromatic dihydric phenol sulfone carbonate, or a mixture of any of the foregoing, in combination with (b) a polyester resin comprising units of an aliphatic diol, an aliphatic ether diol, a cycloaliphatic diol, or a mixture of such diols and an aromatic and/or cycloaliphatic diacid;

(c) a flame retardant amount of a halogen-containing flame retardant agent;

(d) a metal oxide synergist for (c) in an amount which enhances the flame retardancy of the composition; and (e) a phosphorus-containing compound of the formula

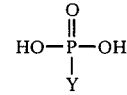

where Y is hydrogen or phenyl, or of the formula

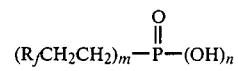

where $R_f = F(CF_2 CF_2)_t$, n and m being independently 1 or 2, and t being an integer from 3 to 8, or a mixture of the two, said component(e) being present in an amount which substantially deactivates the transesterification properties of component (d), and substantially prevents transesterification reactions in the composition during exposure to the elevated temperatures of subsequent processing into a shaped article.

In a preferred embodiment, component (a) comprises an aromatic polycarbonate, especially a poly(bisphenol-A carbonate), and (b) comprises a poly (alkylene terphthalate)resin, especially poly(ethylene terephthalate) or poly(1,4-butylene terephthalate).

With respect to component (a), this can comprise an aromatic polycarbonate resin, which can be made by those skilled in the art or obtained from a variety of commercial sources. They may be prepared by reacting a dihydric phenol with a carbonate precursor, such as phosgene, a haloformate or a carbonate ester. Typically, they will have recurring structural units of the formula:

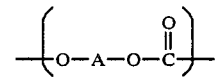

wherein A is a divalent aromatic radical of the dihydric phenol employed in the polymer producing reaction. Preferably, the aromatic carbonate polymers have an intrinsic viscosity ranging from 0.30 to 1.0 dl./g. (measured in methylene chloride at 25° C.). By dihydric phenols is meant mononuclear or polynuclear aromatic compounds containing two hydroxy radicals, each of which is attached to a carbon atom of an aromatic nucleus. Typical dihydric phenols include: 2,2-bis-(4-hydroxyphenyl) propane; 2-2'-bis-(3,5-dimethyl-4-hydroxyphenyl) propane, 4,4'-dihydroxy-diphenyl ether, bis(2-hydroxyphenyl)methane, mixtures thereof and the like. The preferred aromatic carbonate polymer for component (a) is a homopolymer derived from 2,2-bis(4-hydroxy-phenyl) propane(bisphenol-A).

Poly(ester-carbonates) for use in the invention are known and can be obtained commercially. Generally, they are copolyesters comprising recurring carbonate groups:

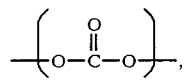

carboxylate groups:

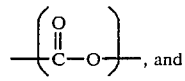

aromatic carbocyclic groups in the linear polymer chain, in which at least some of the carboxylate groups and at least some of the carbonate groups are bonded directly to ring carbon atoms of the aromatic carbocyclic groups. These poly(ester-carbonate) copolymers, in general, are prepared by reacting a difunctional carboxylic acid, such as phthalic acid, isophthalic acid, terephthalic acid, homophthalic acid, o-, m-, and p-phenylenediacetic acid, the polynuclear aromatic acids, such as diphenic acid, 1,4-naphthalic acid, mixtures of any of the foregoing, and the like, with a dihydric phenol and a carbonate precursor, of the types described above. A particularly useful polyester carbonate is derived from bisphenol-A, isophthalic acid, terephthalic acid, or a mixture of isophthalic acid and terephthalic acid, or the reactive derivatives of these acids such as terephthaloyl di-chloride, isophthaloyl dichloride, or a mixture thereof, and phosgene. The molar proportions of dihydroxy diaryl units to benzenedicarboxylate units to carbonate units can range from 1:0.30–0.80:0.70–0.20 and the molar range of terephthalate units to isophthalate units can range from 9:1 to 2:8 in this preferred family of resins.

The aromatic dihydric phenol sulfone resins used in component (a) are a family of resins which can be made by those skilled in this art. For example, homopolymers of dihydric phenol, and a dihydroxydiphenyl sulfone and a carbonate precursor precursor can be prepared as well as copolymers of a dihydric phenol and a carbonate precursor can be made according to the description in Schnell, et al., U.S. Pat. No. 3,271,367. A preferred material is made by polymerizing bis-(3,5-dimethyl-4-hydroxy phenyl) sulfone, alone or especially in combination with bisphenol-A with phosgene or a phosgene precursor, in accordance with the description in Fox, U.S. Pat. No. 3,737,409. Especially preferred is a copolymer made by reacting 40 to 99 weight percent of the sulfone and 1 to 60 weight percent of the bisphenol with phosgene.

With respect to component (b), polyesters suitable for use herein are derived from an aliphatic, aliphatic ether or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid and have repeated units of the following general formula:

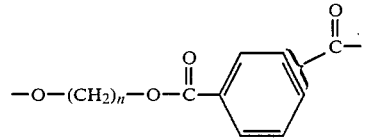

wherein n is an integer of from 2 to 4. The most preferred polyester is poly(ethylene terephthalate).

Also contemplated herein are the above polyesters with minor amounts, e.g., from 0.5 to about 2 percent by weight, of units derived from aliphatic acid and/or aliphatic polyols, to form copolyesters. The aliphatic polyols include glycols, such as poly(ethylene glycol). All such polyesters can be made following the teachings of, for example, U.S. Pat. Nos. 2,465,319 and 3,047,539.

The polyesters that are derived from a cycloaliphatic diol and an aromatic and/or cycloaliphatic dicarboxylic acid are prepared, for example, by condensing either the cis- or trans-isomer (or mixtures thereof), for example, 1,4-cyclohexanedimethanol with an aromatic dicarboxylic acid so as to produce a polyester having recurring units of the following formula:

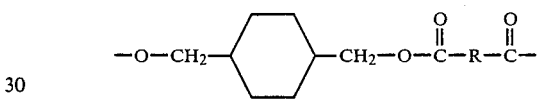

wherein the cyclohexane ring is selected from the cis- and trans-isomers thereof and R represents an aryl or cycloaliphatic radical containing 6 to 20 carbon atoms and which is the decarboxylated residue derived from an aromatic dicarboxylic acid.

Examples of aromatic dicarboxylic acids represented by the decarboxylated residue R are isophthalic or terephthalic acid, 1,2-di(p-carboxyphenyl)ethane, 4,4'-dicarboxydiphenyl ether, etc., and mixtures of these. All of these acids contain at least one aromatic nucleus. Acids containing fused rings can also be present, such as in 1,4- or 1,5-naphthalenedicarboxylic acids. Also contemplated are cycloaliphatic diacids, such as cyclohexane dicarboxylic acid. The preferred dicarboxylic acids are terephthalic acid or a mixture of terephthalic and isophthalic acids.

Another preferred polyester may be derived from the reaction of either the cis- or trans-isomer (or a mixture thereof) of 1,4-cyclohexanedimethanol with a mixture of isophthalic and terephthalic acids. Such a polyester would have repeating units of the formula:

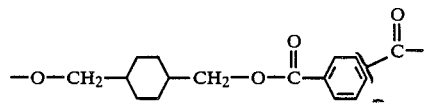

Still another preferred polyester is a copolyester derived from a cyclohexane dimethanol, an alkylene glycol and an aromatic dicarboxylic acid. These copolyesters are prepared by condensing either the cis- or trans-isomer (or mixtures thereof) of, for example, 1,4-cyclohexane-dimethanol and an alkylene glycol with an aromatic dicarboxylic acid so as to produce a copolyester having units of the following formulae:

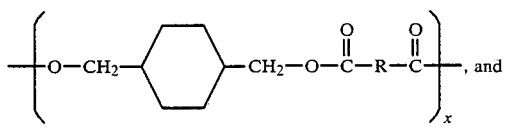

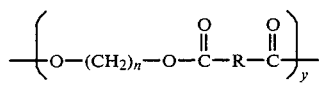

wherein the cyclohexane ring is selected from the cis- and trans-isomers thereof, R is as previously defined, n is an integer of 2 to 4, the x units comprise from about 10 to about 90 percent by weight, and the y units comprise from about 90 to about 10 percent by weight.

Such a preferred copolyester may be derived from the reaction of either the cis- or trans-isomer (or mixtures thereof) of 1,4-cyclohexanedimethanol and ethylene glycol with terephthalic acid in a molar ratio of 1:2:3. These copolyesters have repeating units of the following formulae:

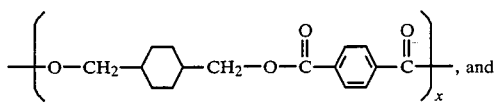

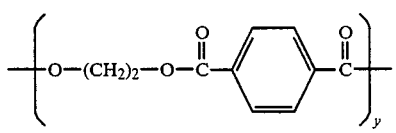

wherein x and y are as previously defined.

Also included within this invention are polyesters derived from aliphatic ether diols, for example, tetraethylene diol, and diacids.

The polyesters described herein are either commercially available or can be produced by methods well known in the art, such as those set forth in, for example, U.S. Pat. No. 2,901,466.

The polyesters used herein have an intrinsic viscosity of from about 0.4 to about 2.0 dl/g. as measured in a 60:40 phenol/tetrachloroethane mixture or similar solvent at 23°–30° C.

The relative amounts of components (a) and (b) can vary widely in the present blends. For instance, component (a) can be present in amounts from about 1 to about 99 parts by weight, and component (b) in amounts from about 99 to about 1 parts by weight.

As regards component (e), only small amounts of this material need be employed, and concentrations of from 0.005 to 5.0 percent by weight, per 100 parts of component (d), will achieve the desired stabilizing effect. The stabilizer will either be orthophosphorous acid (Y=H in the above formula), or phenyl phosphonic acid (Y=-phenyl) or a fluorocarbon-substituted derivative of phosphonic acid, e.g., fluorocarbon substituted phosphonic acid, or a mixture, as indicated. It is preferred to use the smallest amount necessary to obtain the desired result, since amounts in excess of that may be wasted and the possibility exists of some adverse effects on other properties.

For component (c), any conventional halogenated flame retardant agent or agents may be used, in an effective amount, for example, from 5 to 30 parts by weight per 100 parts of (a) and (b) together.

Among the useful flame retardant agents for purposes of this invention are halogen-containing diaromatic compounds such as: 2,2-bis(3,5-dichlorophenyl) propane; bis(2-chlorophenyl)methane; bis(2,6-dibromophenyl) methane; 1,1-bis(4-iodophenyl)ethane; 1,2-bis (2,6-dichlorophenyl)ethane; 1,1-bis(2-chloro-4-iodophenyl) ethane; 1,1-bis(2-chloro-4-methylphenyl)ethane; 1,1-bis (3,5-dichlorophenyl)ethane; 2,2-bis(3-phenyl-4-bromophenyl) ethane; 2,3-bis(4,6-dichloronaphthyl)-propane; 2,2-bis (2,6-dichlorophenyl)pentane; 2,2-bis(3,5-dichlorophenyl) hexane; bis(4-chlorophenyl) phenylmethane; bis(3,5-dichlorophenyl)cyclohexylmethane; bis(3-nitro-4-bromophenyl) methane; bis(4-hydroxy-2,6-dichloro-3-methoxyphenyl)methane; 2,2-bis(3,5-dichloro-4-hydroxyphenyl) propane; and 2,2-bis(3-bromo-4-hydroxyphenyl)propane.

Also useful are substituted benzene compounds such as tetrabromobenzene; hexachlorobenzene; hexabromobenzene; and biphenyls such as 2,2'-dichlorobiphenyl; 2,4'-dibromobiphenyl; 2,4'-dichlorobiphenyl; hexabromobiphenyl; octabromobiphenyl; decabromobiphenyl; and halogenated diphenyl ethers.

Especially preferred are aromatic halogen compounds such as brominated benzene, e.g., hexabromobenzene, and chlorine or bromine-containing aromatic polycarbonates and polystyrenes.

The flame retardant agent, component(c), is used in conjunction with a metal oxide, component (d), chiefly antimony oxide, which functions to boost the flame retardancy effect of (c). Typically, small amounts, from about 10 to about 30 parts by weight, based on 100 parts by weight of (c), are typical.

The compositions can also contain effective amounts of other suitable additives, such as dyes, pigments and other colorants, fillers, reinforcing agents, lubricants, and so forth.

Preparation of the compositions and processing into finished, shaped articles may be accomplished using any suitable method. The ingredients may be mixed together, for instance, with use of extruders, dough mixers, Banbury mixers, or other mixing devices. The resulting blend may be formed or molded using compression, injection, sheeting or extrusion techniques, as desired and in accordance with particular requirements.

The stabilizer, component(e), may be added directly to the blend or, if desired, precoated on the metal oxide.

In one preferred procedure, the ingredients are prepared into a preblend, the preblend is extruded in a single screw extruder at about 520° F., the extrudate is cut into pieces and injection molded at about 530° F. (barrel) and about 160° F. (mold).

DESCRIPTION OF THE SPECIFIC EMBODIMENTS

The invention is further illustrated by the following examples, which are not intended to be limiting.

EXAMPLE 1

To demonstrate the beneficial counteracting effect of the use of phosphorous compounds according to this invention in overcoming the property lowering effect of metal oxides, a number of experiments can be carried out. In all cases the polymer blends and the additives are mixed and melted in a suitable vessel, e.g., a Haake Bowl Mixer at a suitable temperature, e.g., 290° C. Samples of the melt are taken at suitable time intervals, for example 2, 5, 10, and 15 minutes, and a suitable measure of integrity, e.g., intrinsic viscosity, is measured on the samples. In this way, loss in properties as a function of time can be determined for the relevant mixtures. The following compositions were prepared and tested. All parts and percentages are by weight.

PROCEDURE I 50 parts of aromatic polycarbonate (LEXAN 100), 50 parts of poly(1,4-butylene terephthalate) (VALOX 310) and 2 parts of $Sb_2O_3$(Thermogard L) were mixed and churned at 290° C. for 2, 5, 10, and 15 minutes (Sample A). The procedure was repeated but with $Sb_2O_3$ which had been surface treated with 0.1% of its weight of orthophosphorous acid (Sample B). The procedure of Sample B was repeated, but using surface treated $Sb_2O_3$ wherein the orthophosphorous acid content was 0.5% (Sample C). The procedure of Sample B was repeated with 1.0% surfacetreated $Sb_2O_3$ (Sample D). The procedure of Sample A was repeated, but there was also included 0.7 parts of orthophosphorous acid (Sample E).

After the samples were submitted to intrinsic viscosity measurements in 60:40 TCE:Phenol at 30° C., it was observed that, without orthophosphorous acid, antimony oxide caused a decrease in i.v. of from 0.85 to 0.52 with orthophosphorous acid, the decrease in i.v. was only from 0.85 to 0.65, which was even better than shown by the polymer mixture without any metal salt at all, from 0.85 to 0.60 dl./g. Thus the orthophosphorous acid demonstrated a surprising and unexpected passivating effect.

PROCEDURE II 72 parts of aromatic polycarbonated (LEXAN 100), 21 parts of poly(ethylene terephthalate), and minor amounts of impact modifiers and organic stabilizers were churned and melted in a Haake bowl and samples were taken at 2, 5, 10 and 15 minutes for i.v. measurements (Sample F). The procedure was repeated, adding, respectively, 2 parts of antimony oxide (Sample G), 2 parts of antimony oxide surface treated with 1% $H_3PO_3$, based on $Sb_2O_3$ (Sample H), 2 parts of antimony oxide treated with 0.1% of $H_3PO_3$, same basis (Sample I) and 2 parts of antimony oxide treated with 0.5% of $H_3PO_3$, same basis (Sample J). Sample F, without metal oxide showed a 2 minute i.v. change of 0.54 to 0.53 (negligible), Sample J, with $H_3PO_3$ showed a steady i.v., no change in 2 minutes, and, with Sample G, antimony oxide without $H_3PO_3$, a significant i.v. drop was shown 0.53 to 0.50 dl./g. after 2 minutes. Thus, the passivating effect of the phophorous compound was again demonstrated.

EXAMPLE

A flame-retardant composition, stabilized Incording to this invention was next prepared, and compared for flame retardant efficiency with a state-of-the-art composition which did not contain antimony oxide.

30 parts of poly(bisphenol A carbonate), 19.5 parts of poly(ethylene terephthalate), and 42.5 parts of a 1:1 ratio poly(tetrabromobisphenol A-bisphenol A carbonate) resinous flame retardant additive and minor amounts of conventional impact modifiers and organic stabilizers were compounded, molded and tested for flame retardancy by the known Limiting Oxygen Index (LOI) test A second formulation was made which included 2 parts of antimony oxide surface treated with 0.5% $H_3PO_3$, based on $Sb_2O_3$. Again, after molding, the LOI was measured. The composition without antimony oxide had a LOI of 28.3. The composition according to this invention, with surface-treated antimony oxide had a higher (and better) LOI of 30.7. All of its other important physical properties were within acceptable limits.

All of the patents mentioned above are incorporated herein by reference.

Other modifications and variations of the invention are possible and will occur to those skilled in the art in the light of the above disclosure. For example, instead of an aromatic polycarbonate, an aromatic poly (ester-carbonate), an aromatic dihydric phenol sulfone carbonate can be used. The polyester can comprise units derived from a cycloaliphatic diol. Instead of orthophosphorous acid, phenyl phosphonic acid or a fluorocarbon substituted phosphonic acid can be used. It is to be understood, therefore, that changes may be made in the particular embodiments shown which are within the scope of the invention defined in the appended claims.

I claim:
1. A thermoplastic composition, comprising
   (a) an aromatic polycarbonate, an aromatic poly(ester-carbonate), an aromatic dihydric phenol sulfone carbonate, or a mixture of any of the foregoing, in combination with
   (b) a polyester resin comprising units of an aliphatic diol, an aliphatic ether diol, a cycloaliphatic diol, or a mixture of such diols and an aromatic or cycloaliphatic diacid;
   (c) a flame retardant amount of a halogen-containing flame retardant agent;
   (d) a metal oxide synergist for (c) in an amount which enhances the flame retardancy of the composition; and
   (e) a phosphorus-containing compound of the formula

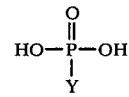

where Y is hydrogen or phenyl, or of the formula

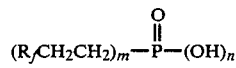

where $R_f$ is $F(CF_2 CF_2)_t$, n and m are independently 1 or 2, and t is an integer from 3 to 8, said component (e) being present in an amount which substantially deactivates the transesterification causing properties of (d) and prevents said transesterification from occuring when the composition is processed at elevated temperatures.

2. A composition according to claim 1, in which component (a) comprises a poly(alkylene terephthalate)resin.

3. A composition according to claim 2, in which (a) comprises poly(bisphenol-A carbonate) and (b) comprises poly(1,4-butylene terephthalate), poly(ethylene terephthalate) or a mixture of both.

4. A composition according to claim 1, in which component (a) comprises a poly(ester-carbonate) and component (b) comprises a copolyester.

5. A composition according to claim 4, in which the copolyester is derived from isophthalic acid, terephthalic acid and an aliphatic diol.

6. A composition according to claim 1, in which (a) comprises an aromatic dihydric phenol sulfone and (b) comprises a copolyester.

7. A composition according to claim 6, in which (a) is a copolymer of sulfone and bisphenol-A with phosgene and (b) is derived from isophthalic acid, terephthalic acid and an aliphatic diol.

8. A composition according to claim 1, in which the aromatic polycarbonate of (a) has recurring structural units of the formula

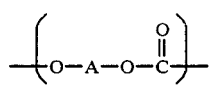

wherein A is a divalent aromatic radical of a dihydric phenol.

9. A composition according to claim 1, in which the poly(ester-carbonate) of (a) has recurring carbonate groups, recurring carboxylate groups and aromatic carboxyclic groups in the linear polymer chain, with at least some of the carboxylate groups and carbonate groups being bonded directly to ring carbon atoms of the aromatic carbocyclic groups.

10. A composition according to claim 1, in which the polyester of (b) has recurring units of the

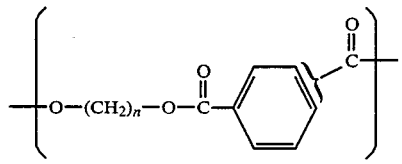

wherein n is an integer of from 2 to 4.

11. A composition according to claim 1, in which (b) has recurring units of the formula

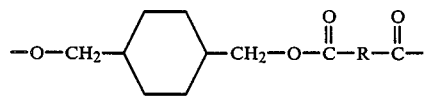

wherein R is aryl or cycloaliphatic having from 6 to 20 carbon atoms and which is the decarboxylated residue derived from an aromatic dicarboxylic acid.

12. A composition according to claim 1, in which (b) has repeating units of the formula

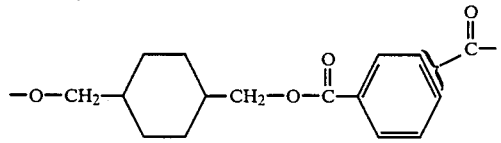

13. A composition according to claim 1, in which (b) is a copolyester having repeating units of the formulae

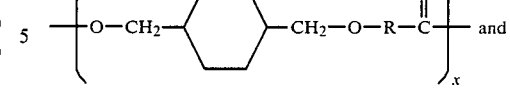

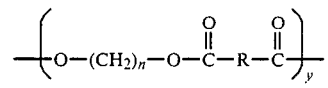

wherein R is aryl or cycloaliphatic having from 6 to 20 carbon atoms, the x units comprise from about 10 to about 90 percent by weight, and the y units comprise from about 90 to about 10 percent by weight.

14. A composition according to claim 13, in which (b) is derived from the reaction of 1,4-cyclohexanedimethanol and ethylene glycol with terephthalic acid.

15. A composition according to claim 1, in which component (d) is antimony oxide.

16. A composition according to claim 1, in which component (e) is orthophosphorous acid.

17. A composition according to claim 1, which comprises from about 1 to about 99 parts by weight of (a), from about 99 to about 1 parts by weight of (b), from about 5 to about 30 parts by weight of (c), per 100 parts by weight of (a) and (b) together, from about 10 to about 30 parts by weight of (d), per 100 parts of (c), and from about 0.005 to about 5 parts by weight of (e), per 100 parts by weight of (d).

18. A method for imparting color stability to a thermoplastic molding composition comprising (a) an aromatic polycarbonate, an aromatic poly(ester-carbonate), an aromatic dihydric phenol sulfone carbonate, or a mixture of any of the foregoing, in combination with (b) a polyester resin comprising units of an aliphatic diol, an aliphatic ether diol, a cycloaliphatic diol, or a mixture of such diols and an aromatic or cycloaliphatic diacid, said method comprising including in the composition (c) a flame retardant amount of a halogen-containing flame retardant agent;

(d) a metal oxide synergist for (c) in an amount which enhances the flame retardancy of the composition; and (e) a phosphorus-containing compound of the formula

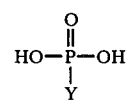

where Y is hydrogen or phenyl, or of the formula

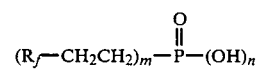

where $R_f$ is $F(CF_2\ CF_2)_t$, n and m are independently 1 or 2, and t is an integer from 3 to 8, said component (e) being present in an amount which substantially deactivates the transesterification causing properties of (d) and prevents said transesterification from occuring when the composition is processed at elevated temperatures.

19. A method according to claim 18, in which component (e), is added to the composition by dry blending.

20. A method according to claim 18, in which component (a) comprises an aromatic polycarbonate and component (b) comprises a poly(alkylene terephthalate).

21. A composition according to claim 20, in which (a) comprises poly(bisphenol-A carbonate) and (b) comprises poly(1,4-butylene terephthalate), poly(ethylene terephthalate) or a mixture of both.

22. A method according to claim 18, in which component (a) comprises a poly(ester-carbonate) and component (b) comprises a copolyester.

23. A method according to claim 22, in which (b) is derived from isophthalic acid, terephthalic acid and an aliphatic diol.

24. A method according to claim 18, in which component (a) comprises an aromatic dihydric phenol sulfone and component (b) comprises a copolyester.

25. A method according to claim 24, in which (a) is a copolymer of sulfone and bisphenol-A with phosgene and (b) is derived from isophthalic acid, terephthalic acid and an aliphatic diol.

26. A method according to claim 18, in which the aromatic polycarbonate of (a) has recurring structural units of the formula

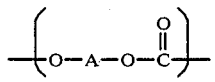

wherein A is a divalent aromatic radical of a dihydric phenol.

27. A method according to claim 18, in which the poly(ester-carbonate) of (a) has recurring carbonate groups, recurring carboxylate groups and aromatic carbocyclic groups in the linear polymer chain, with at least some of the carboxylate groups and carbonate groups being bonded directly to ring carbon atoms of the aromatic carbocyclic groups.

28. A method according to claim 18, in which the polyester of (b) has recurring units of the formula

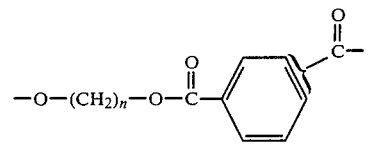

wherein n is an integer of from 2 to 4.

29. A method according to claim 18, in which (b) has recurring units of the formula

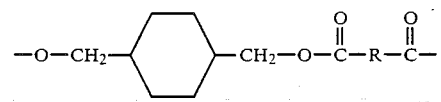

wherein R is aryl or cycloaliphatic having from 6 to 20 carbon atoms and which is the decarboxylated residue derived from an aromatic dicarboxylic acid.

30. A method according to claim 18, in which (b) has repeating units of the formula

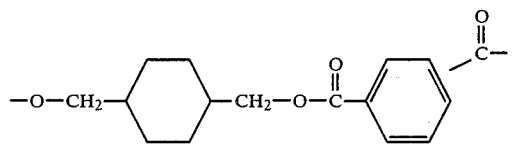

31. A composition according to claim 18, in which (b) is a copolyester having repeating units of the formulae

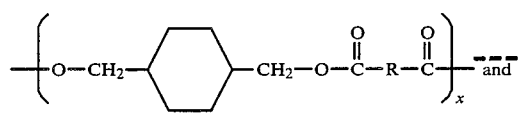

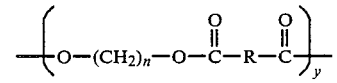

wherein R is aryl or cycloaliphatic having from 6 to 20 carbon atoms, the x units comprise from about 10 to about 90 percent by weight, and the y units comprise from about 90 to about 10 percent by weight.

32. A method according to claim 31, in which (b) is derived from the reaction of 1,4-cyclohexanedimethanol and ethylene glycol with terephthalic acid.

33. A method according to claim 18, in which (d) is antimony oxide.

34. A method according to claim 18, in which (e) is orthophosphorous acid.

* * * * *